United States Patent
Itai

[19]

[11] Patent Number: 5,200,881
[45] Date of Patent: Apr. 6, 1993

[54] GAS INSULATED SWITCHGEAR

[75] Inventor: Kousaku Itai, Amagasaki, Japan

[73] Assignee: Mitsubishi Denki Kabushiki Kaisha, Tokyo, Japan

[21] Appl. No.: 736,715

[22] Filed: Jul. 26, 1991

[30] Foreign Application Priority Data

Jul. 27, 1990 [JP] Japan ................................. 2-198035
Aug. 29, 1990 [JP] Japan ................................. 2-225199

[51] Int. Cl.⁵ ..................... H02B 5/00; H02B 13/035; H01H 33/00
[52] U.S. Cl. ................................. 361/333; 200/148 R; 200/148 B; 361/335; 361/341
[58] Field of Search ..................... 200/148 R, 148 B; 361/331-333, 341, 335, 376

[56] References Cited

U.S. PATENT DOCUMENTS 4,677,525 6/1987 Mitomo ............................... 361/341
4,899,250 2/1990 Itai ..................................... 361/341

FOREIGN PATENT DOCUMENTS

58-166212 11/1983 Japan .
62-257759 10/1987 Japan .

Primary Examiner—J. R. Scott
Attorney, Agent, or Firm—Burns, Doane, Swecker & Mathis

[57] ABSTRACT

In one-and-a half system gas insulated switchgear, three circuit breakers are parallelly aligned between a pair of main buses with a right angle thereto and connected in series at each other between the main buses. A first set of disconnecting switches are mounted on both end parts of the circuit breakers and support the main buses and connection buses. A second set of disconnecting switches are connected to a joint between pairs of adjacent first disconnecting switches and connected to a pair of three-phase bushings.

13 Claims, 15 Drawing Sheets

GAS INSULATED SWITCHGEAR

FIELD OF THE INVENTION AND RELATED ART STATEMENT

1. Field of the Invention

The present invention relates to gas insulated switchgear to be installed in a power plant, a substation and the like, and more particularly it is concerned with compact and space-saving arrangement of the parts and components of such switchgears.

2. Description of the Related Art

Figure 14:
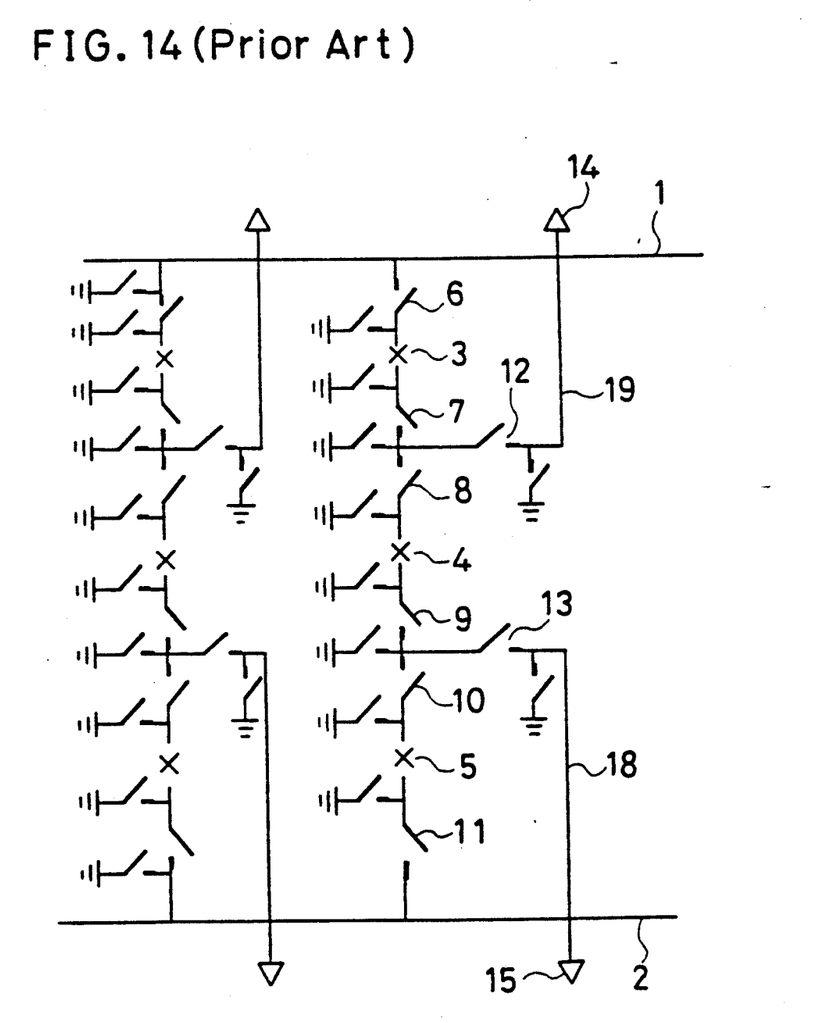
FIG. 14 is a skeleton diagram corresponding to FIGS. 1, 5 and 19.

FIG. 14 is a skeleton diagram of conventional one-and-a-half system gas insulated switchgear. In this one-and-a-half system, three circuit breakers 3, 4 and 5, as well as six first disconnecting switches 6 through 11 associated therewith are connected in series and across double main buses, i.e. a first and a second main buses 1 and 2. A joint between the first disconnecting switches 7 and 8 is connected to a bushing 14 through a second disconnecting switch 12, while a joint between the first disconnecting switch 9 and 10 is connected to a bushing 15 through another second disconnecting switch 13. An arrangement of these devices has been disclosed in, for instance, Jikkaisho (Japanese Laid-open Utility Model Application Sho) 58-166,212.

Figure 17:
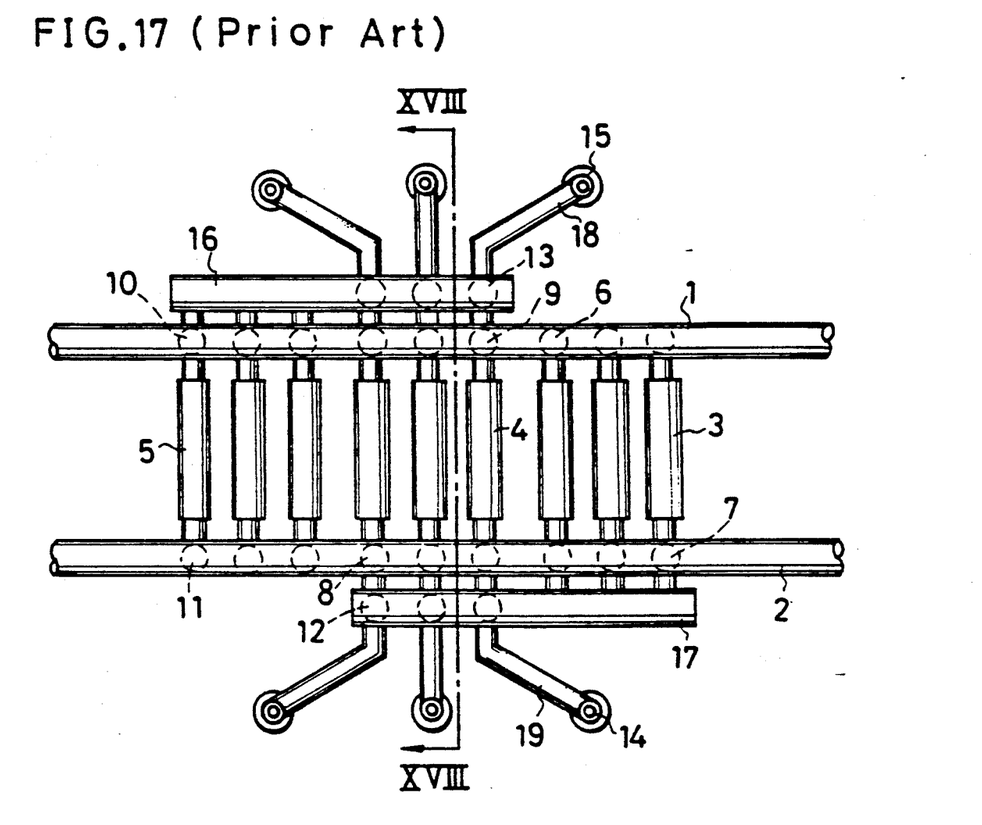
FIG. 17 is a plan view showing an example of the conventional gas insulated switchgear.
Figure 18:
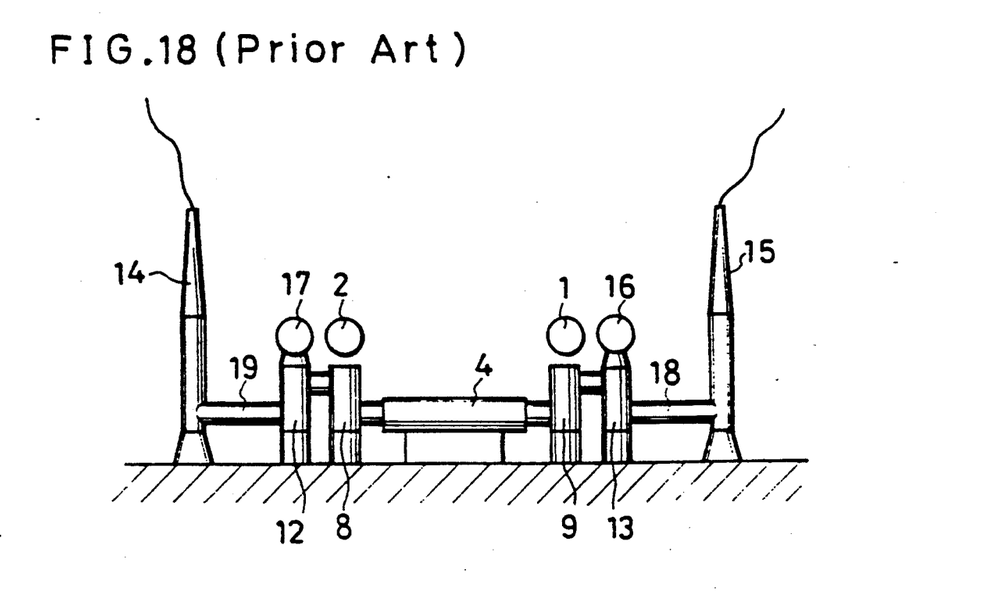
FIG. 18 is a cross-sectional view taken on the line XVIII—XVIII of FIG. 17.

FIG. 17 is a plan view of an exemplified arrangement of gas insulated switchgear embodying the skeleton diagram of FIG. 14, and FIG. 18 is a cross-sectional view taken on the line XVIII—XVIII of FIG. 17. In this arrangement, the first through third circuit breakers 3, 4 and 5, as well as the first disconnecting switches 6 through 11 accompanied thereto are mounted on the ground. All of these first disconnecting switches 6 through 11 are outside the both ends of the laterally extended circuit breakers 3, 4 and 5. The first and the second main buses 1 and 2 as well as connection buses 16 and 17 are provided on a plane of the same level above that of the disconnecting switches. The connection buses 16 and 17 connect the corresponding sets of the first disconnecting switches with each other in a bundle and with the sets of the second connection switches 12 and 13. The sets of the second disconnecting switches 12 and 13 are connected to a pair of the sets of bushings 14 and 15, which are to be connected to feeders, through branch buses 19, and 18, respectively.

Figure 15:
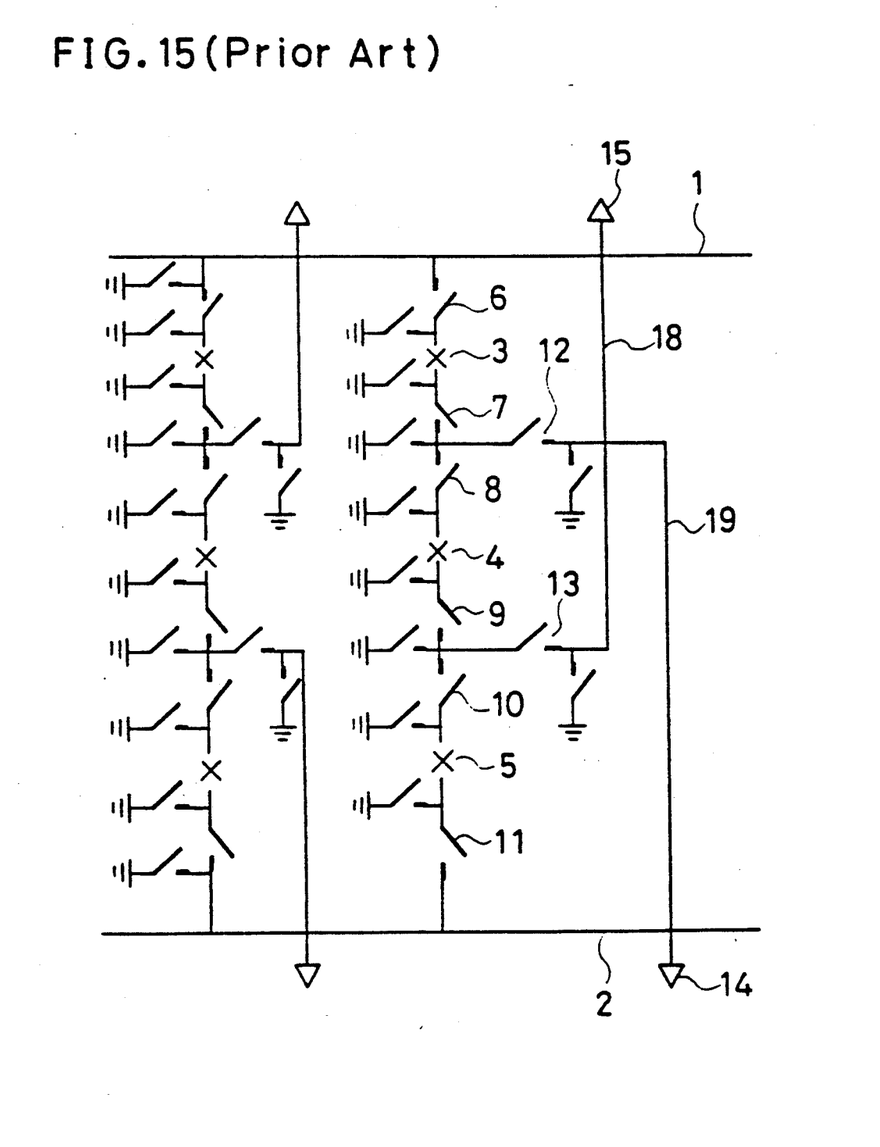
FIGS. 15 and 16 are a skeleton diagrams corresponding to FIGS. 9 and 13, respectively.
Figure 19:
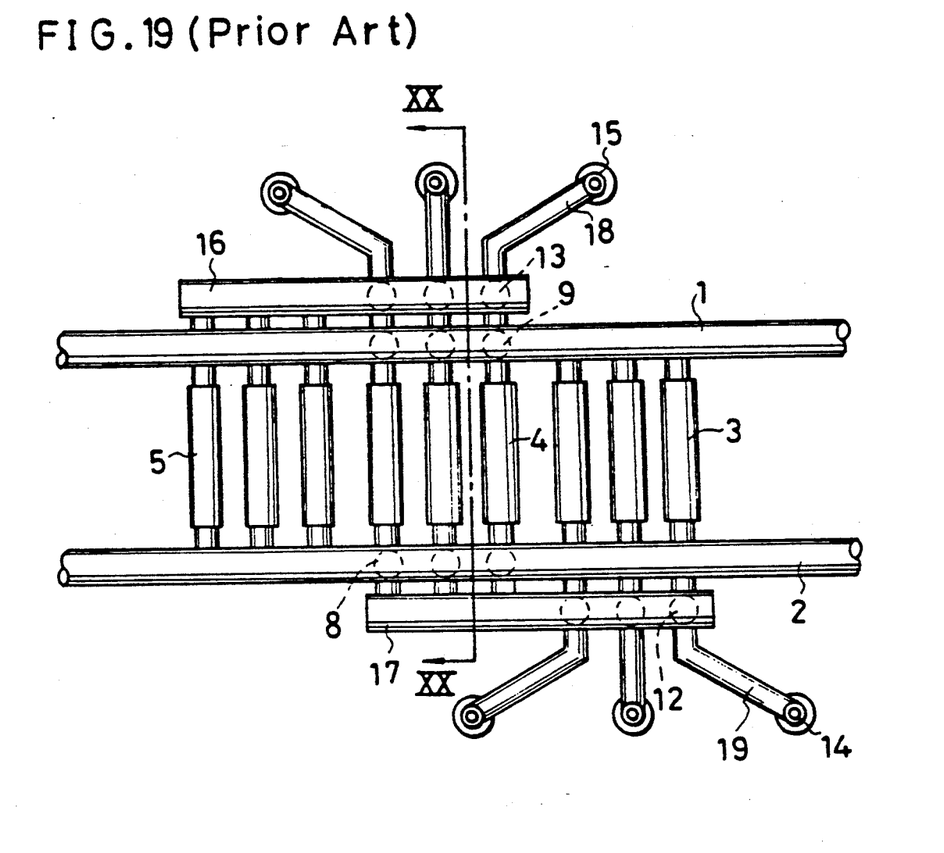
FIG. 19 is a plan view showing another example of the conventional gas insulated switchgear.
Figure 20:
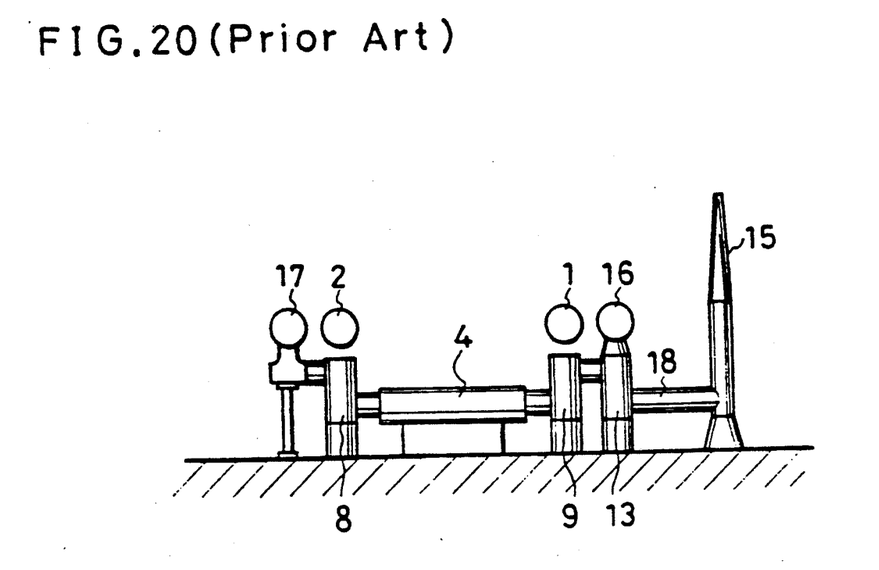
FIG. 20 is a cross-sectional view taken on the line XX—XX of FIG. 19.

FIG. 19 is a plan view of another conventional arrangement embodying the skeleton diagram of FIG. 15, while FIG. 20 is a cross-sectional view taken on the line XX—XX of FIG. 19, wherein only the second disconnecting switches 12 and the branch buses 19 are differently disposed.

The above-mentioned conventional gas insulated switchgear have a structure wherein the first through third circuit breakers are aligned in parallel with each other in a common plane, and each of the circuit breakers and the accompanying disconnecting switches are aligned along a straight line on the ground. Thus, it has a drawback in that a large building site is indispensable for its installation.

Figure 16:
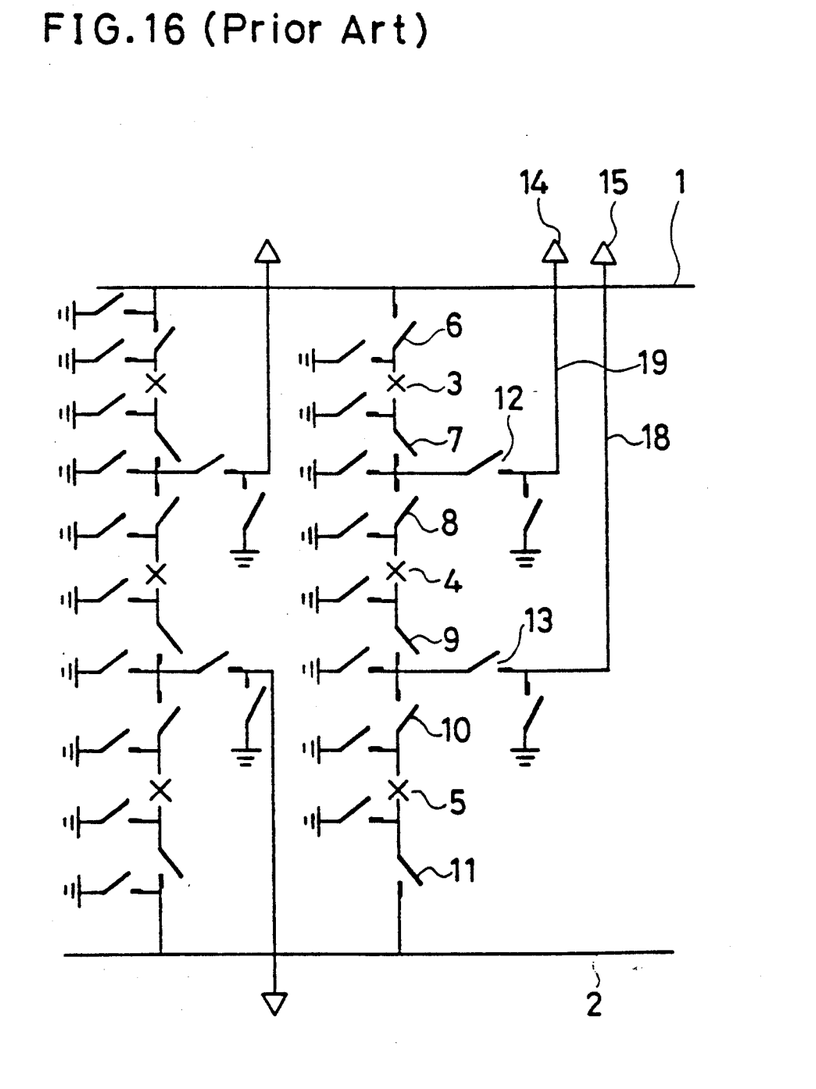

In addition to this, if one wishes to embody the skeleton diagram shown in FIG. 15 or in FIG. 16, wherein the two branch buses are taken out from the switchgear in the direction opposite to that shown in FIG. 14, or alternatively, both the two branch buses are taken out from the switchgear in the same direction, there are some problem which result in an undesirable widening of the spaces between the circuit breakers and the undesirable disposition of the branch buses in that space or the undesirable disposition of extending ends at each-other opposite ends of the system, or leading them to pass over the first and the second main buses as well as the connection buses. This is also disadvantageous in that it unduly complicates the structure, and requires a larger building site with a higher minimum permissible height.

OBJECT AND SUMMARY OF THE INVENTION

It is therefore an object of the present invention to provide a gas insulated switchgear which is simple in structure and requires only a small building site for its installation.

According to the present invention, there is provided a gas insulated switchgear comprising:

a pair of main buses which are disposed in substantial parallelism with each other defining a space therebetween;

a plural sets of circuit breakers which are parallelly aligned in said space and on a plane under the plane defined by said main buses, with a substantial right angle to said main buses;

a plural sets of first disconnecting switches which are mounted on both ends of said circuit breakers, for connecting said plural sets of circuit breakers one another to form series connection and said series connection being connected across said main buses, the corresponding sets of said first disconnecting switches supporting said main buses;

a plurality of connection buses for connecting adjacent two sets of said circuit breakers through the adjacent sets of said first disconnecting switches over said circuit breakers, each of said connection buses being disposed in parallel with said main buses, and supported by the adjacent sets of said first disconnecting switches;

a plural sets of second disconnecting switches which are supported by the corresponding sets of said first disconnecting switches, each of said second disconnecting switches being connected, at its end, to a joint between adjacent two of said first disconnecting switches; and a plural sets of branch buses which are connected to the plural sets of said second disconnecting switches, each of said branch buses being connected through a bushing to an outer feeder.

In the gas insulated switchgear, each of said circuit breakers may preferably accompany two of said first disconnecting switches on its both ends, and each of the joint between the adjacent two of said first disconnecting switches may be connected to each of said second disconnecting switches.

Said main buses may preferably be mounted on tops of the corresponding sets of said first disconnecting switches. In that case, each of said connection buses may preferably be disposed over the mid parts of said circuit breakers with a substantial space therebetween, and supported by the corresponding sets of said first disconnecting switches at their sides. Further, all of said connection buses, said second disconnecting switches and said branch buses may preferably be disposed on the same plane which is disposed under the plane defined by said main buses.

Alternatively, each of said connection buses may preferably be mounted on the top ends of the corresponding sets of said first disconnecting switches. In that case, the corresponding sets of said first disconnecting switches, on the top ends of which said connection buses are mounted, may also support the corresponding sets of said second disconnecting switches at their side, for connecting the corresponding sets of said first disconnecting switches to said branch buses. Further, each of said main buses may preferably be outside the region defined by said parallelly aligned circuit breakers, and may be supported at the lateral ends of the corresponding sets of said first disconnecting switches which are in parallel with and mounted on said circuit breakers and laterally extended from the ends of said circuit breakers. In that case, the plane defined by said connection buses may be disposed above the plane defined by said second disconnecting switches and said branch buses which is disposed above the plane defined by said main buses. Moreover, at least one set of said second disconnecting switches and the corresponding sets of said branch buses may be supported by the corresponding sets of said first disconnecting switches, which are parallel with said circuit breakers, over the corresponding sets of said circuit breakers and taken out from the switchgear over at least one of said main buses.

In the above-mentioned gas insulated switchgear, a pair of connection buses, a pair of branch buses, a pair of bushings, three sets of said circuit breakers, three sets of said first disconnecting switches, and two sets of said second disconnecting switches may be contained. As previously described, the gas insulated switchgear built in accordance with the present invention is advantageous in its simple structure which permits a compact design and requires only small building site for its installation.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

It will be recognized that some or all of the figures are schematic representations for purposes of illustration and do not necessarily depict the actual relative sizes or locations of the elements shown.

DESCRIPTION OF THE PREFERRED EMBODIMENT

Hereinafter, preferred embodiments of the present invention will be described with reference to the accompanying drawings, wherein parts and components which are the same as those in the conventional gas insulated switchgear are denoted by the corresponding reference numerals throughout the several figures. The shown gas insulated switchgear is a one-and-a-half system in common wherein double main buses and three circuit breakers (per one phase circuit) are provided.

In the following description of the embodiment, gas insulated switchgears are embodied on the three-phase enclosed type bus system as the main buses and the connection buses. Furthermore, the gas insulated switchgear may be embodied also on phase-segregated type buses. And still furthermore, circuit breakers and disconnecting switches may be embodied on the three-phase enclosed type bus system. In all of them, the same technical advantage will be available.

EXAMPLE 1

Figure 1:
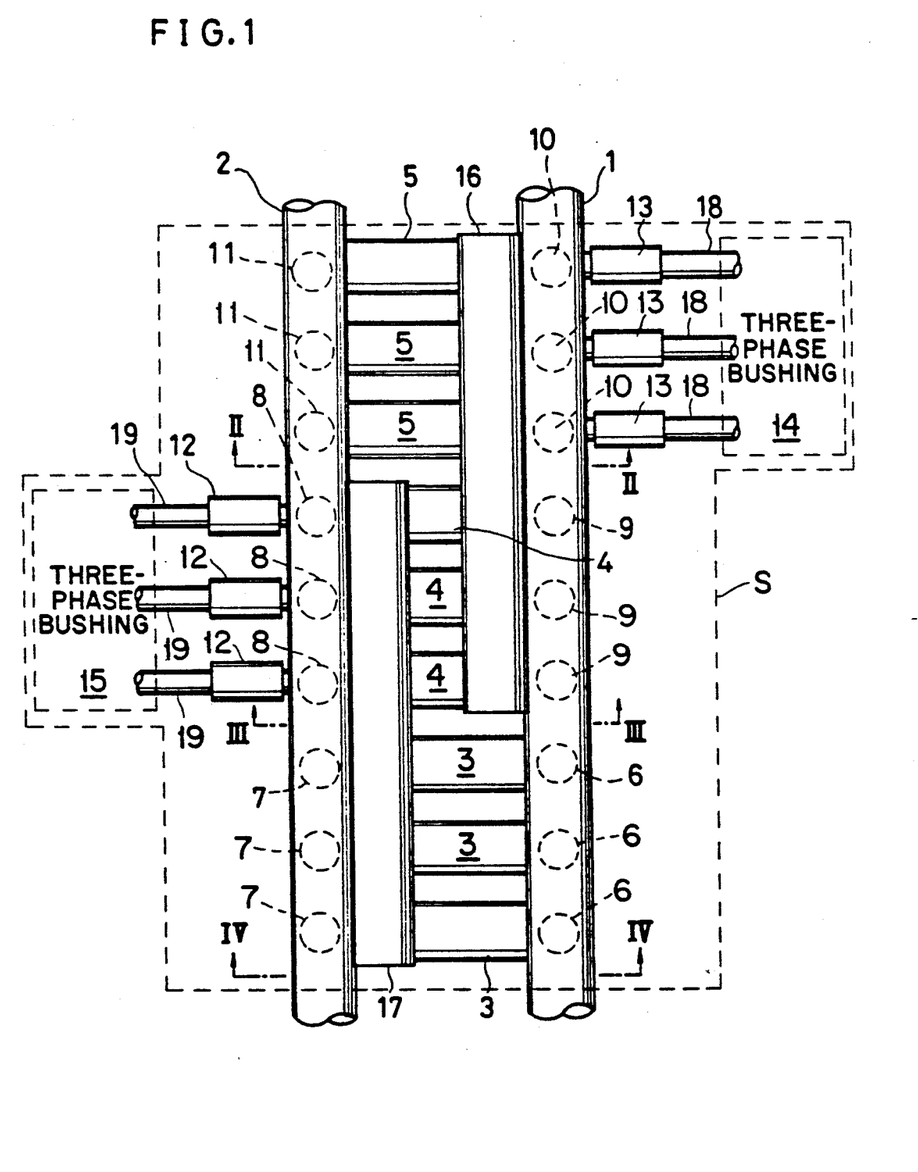
FIG. 1 is a plan view showing a gas insulated switchgear of an embodiment of the present invention.
Figure 2:
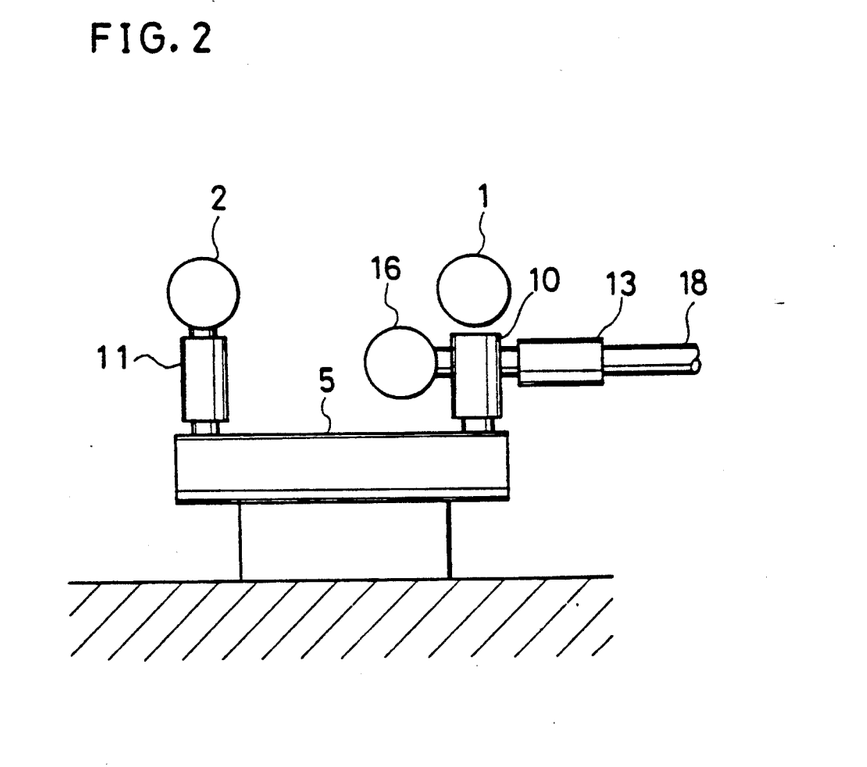
FIG. 2 is a cross-sectional view taken on the line II—II of FIG. 1.
Figure 3:
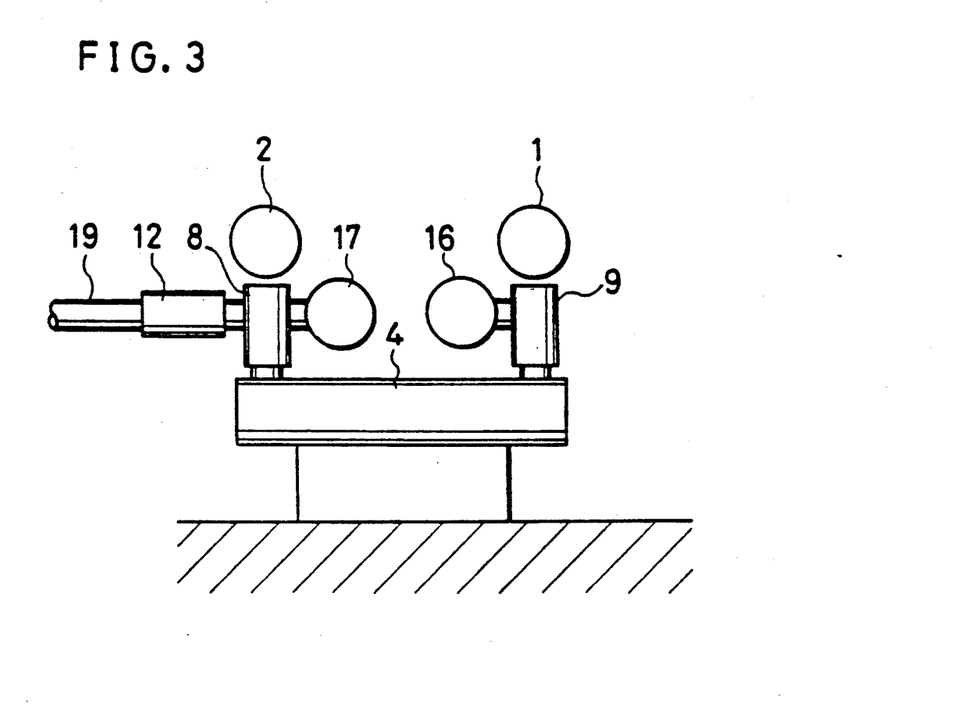
FIG. 3 is a cross-sectional view taken on the line III—III of FIG. 1.
Figure 4:
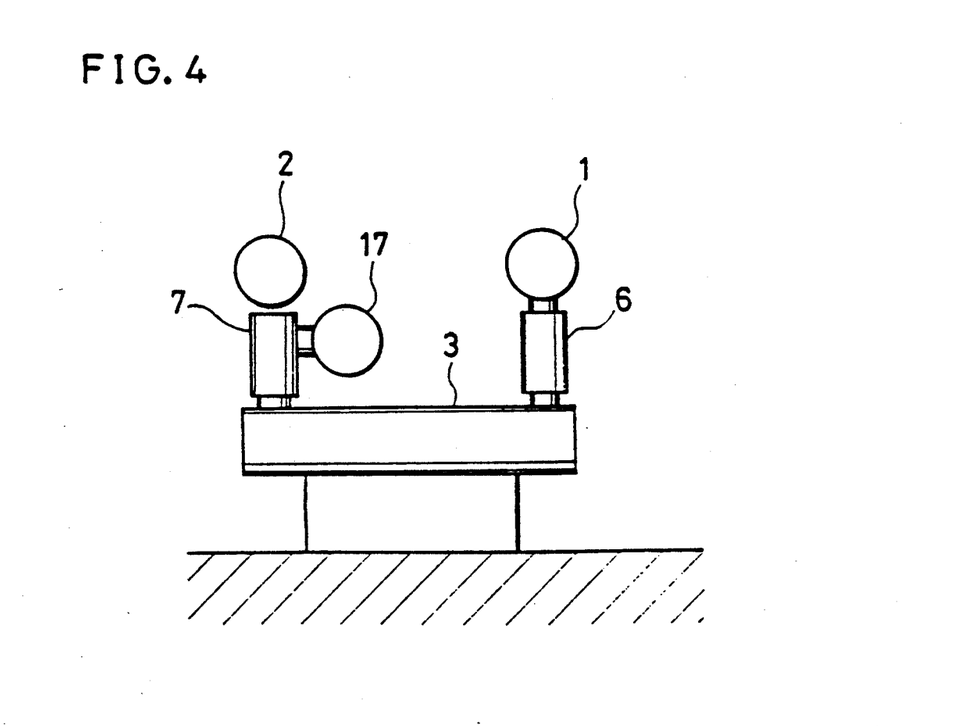
FIG. 4 is a cross-sectional view taken on the line IV—IV of FIG. 1.

FIG. 1 through FIG. 4 show an embodiment of the gas insulated switchgear built in accordance with the present invention. FIG. 1 is a plan view showing the gas insulated switchgear embodying the skeleton diagram of FIG. 14. FIG. 2 is a cross sectional view taken on the line II—II of FIG. 1. FIGS. 3 and 4 are cross-sectional views taken on the lines III—III and IV—IV of FIG. 1, respectively. In those figures, a first and a second main buses 1 and 2 are disposed in substantial parallelism with each other defining a space therebetween. Three sets of a first, a second and a third circuit breakers 3, 4 and 5 are parallelly aligned in said space and on a plane under the plane defined by said main buses 1 and 2, and are connected in series with each other between said main buses. First sets of disconnecting switches 6, 7, 8, 9, 10 and 11 are mounted upright on each of said both end parts of said circuit breakers 3, 4 and 5, and connected thereto at their bottom ends. The first and second main buses 1 and 2 are provided along the rows of the disconnecting switches 6 through 11 and connected to the respective sets of the disconnecting switches 6 and 11 at their top ends. In other words, the center lines of the main buses 1 and 2 cross the center lines of the disconnecting switches 7, 8, 9 and 10 at a right angle.

On the other hand, connection buses 16 and 17 are connected to the circuit breakers 3, 4 and 5 through the sets of the disconnecting switches 9 and 10, and the sets of the disconnecting switches 7 and 8, respectively. Each of the connection buses 16 and 17 is supported by the corresponding set of the disconnecting switches at their sides. The connection buses 16 and 17 are disposed in parallel with the first and the second main buses 1 and 2 therebetween and on a plane lower than the plane defined by the main buses 1 and 2, and suspended over the mid parts of the circuit breakers 3, 4 and 5. Further, second sets of disconnecting switches 13 and 12 are connected to a joint between the disconnecting switches 9 and 10, and to another joint between the disconnecting switches 7 and 8, respectively. The disconnecting switches 13 and 12 are connected to a pair of three phase bushings 14 and 15, which are to be connected to feeders, through branch buses 19 and 18, respectively.

Configured as above-stated, the size of the switchgear between the first and the second main buses 1 and 2 is remarkably reduced; and thus size of the site for a structure 5 for containing the switchgear is drastically reduced.

In this embodiment, the disconnecting switches 12 and 13 are directly connected to the disconnecting switches 8 and 10, respectively. Although the branch buses 18 and 19 extend out from the parts where the disconnecting switches 10 and 8 are provided in this embodiment, these may otherwise be configured to be taken out from the parts, where the disconnecting switches 9 and 7 are provided, and such configuration gives the same technical advantage.

EXAMPLE 2

Figure 5:
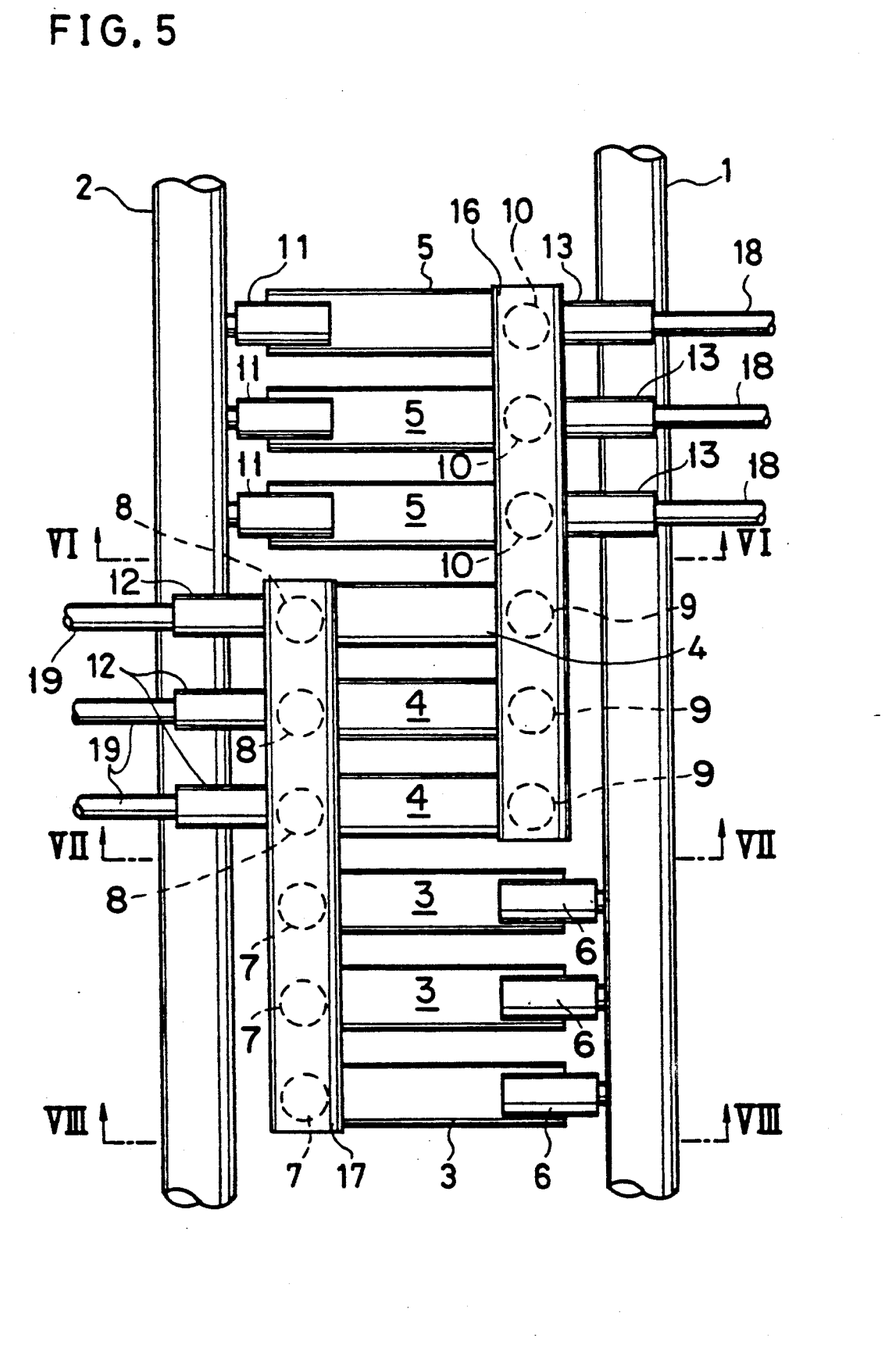
FIG. 5 is a plan view showing a gas insulated switchgear of another embodiment of the present invention.
Figure 6:
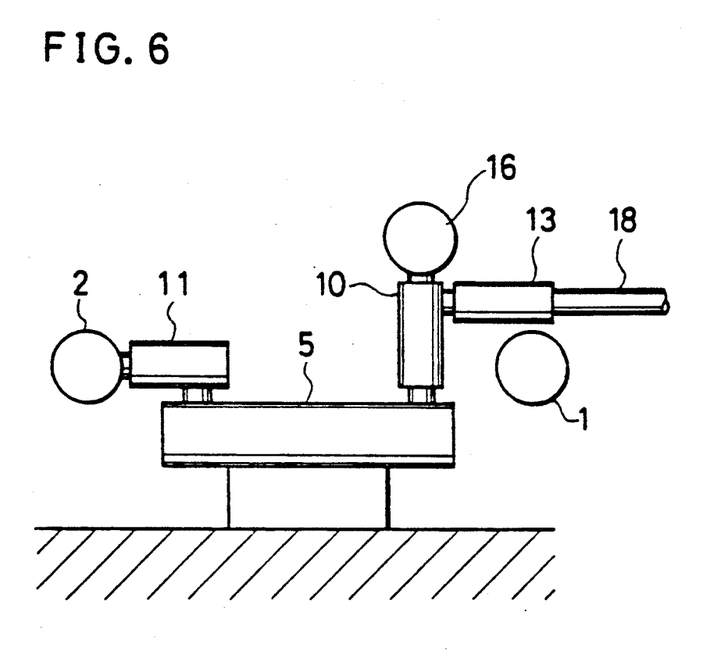
FIG. 6 is a cross-sectional view taken on the line VI—VI of FIG. 5.
Figure 7:
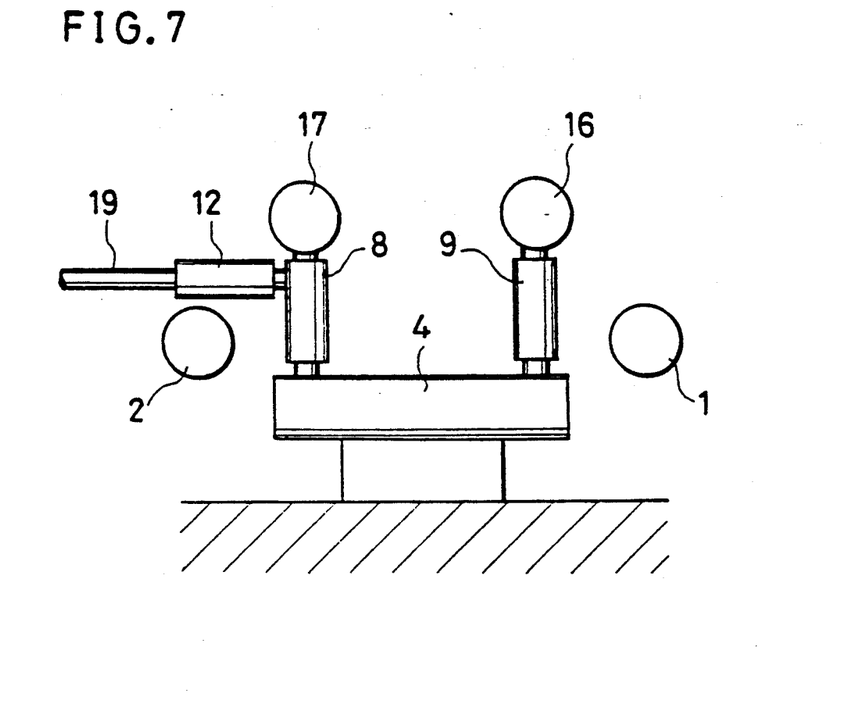
FIG. 7 is a cross-sectional view taken on the line VII—VII of FIG. 5.
Figure 8:
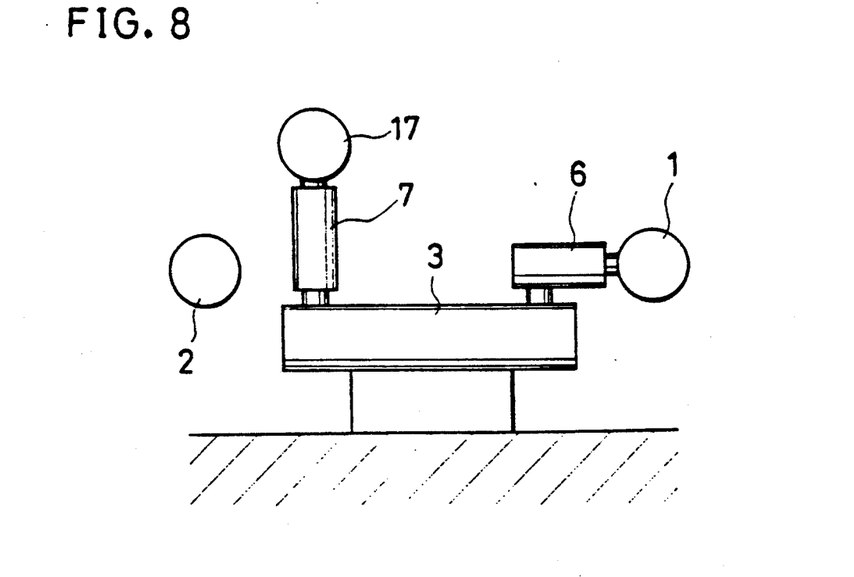
FIG. 8 is a cross-sectional view taken on the line VIII—VIII of FIG. 5.

FIG. 5 through FIG. 8 show another embodiment of the gas insulated switchgear built in accordance with the present invention. FIG. 5 is a plan view similar to FIG. 1, corresponding to the gas insulated switchgear also embodying the skeleton diagram of FIG. 14. FIG. 6 is a cross sectional view taken on the line VI—VI of FIG. 5. FIGS. 7 and 8 are cross-sectional views taken on the lines VII—VII and VIII—VIII of FIG. 5, respectively. This embodiment differs from that of Example 1 in the following points.

1) The first and the second main buses 1 and 2 are provided outside the region occupied by the circuit breakers 3, 4 and 5, and are supported by the laterally extended sets of the disconnecting switches 6 and 11 instead of being mounted on top of the upright disconnecting switches;

2) The connection buses 16 and 17 are mounted on top of the corresponding set of the disconnecting switches 7, 8, 9 and 10, instead of being supported by the disconnecting switches at their sides; and, 3) The first and second main buses 1 and 2 are on a plane which is lower than the plane defined by the connection buses 16 and 17, and the disconnecting switches 12 and 13 and the branch buses 18 and 19 are on a plane between the above-mentioned planes.

By configuring the switchgear as exemplified with reference to FIGS. 1–4, a compact design with minimum width of the switchgear can be realized. The following examples, illustrated with reference to FIGS. 5–13, will also provide a similar compact design of the switchgear under the conditions wherein the branch buses must be taken out in the directions opposite to each other.

EXAMPLE 3

Figure 9:
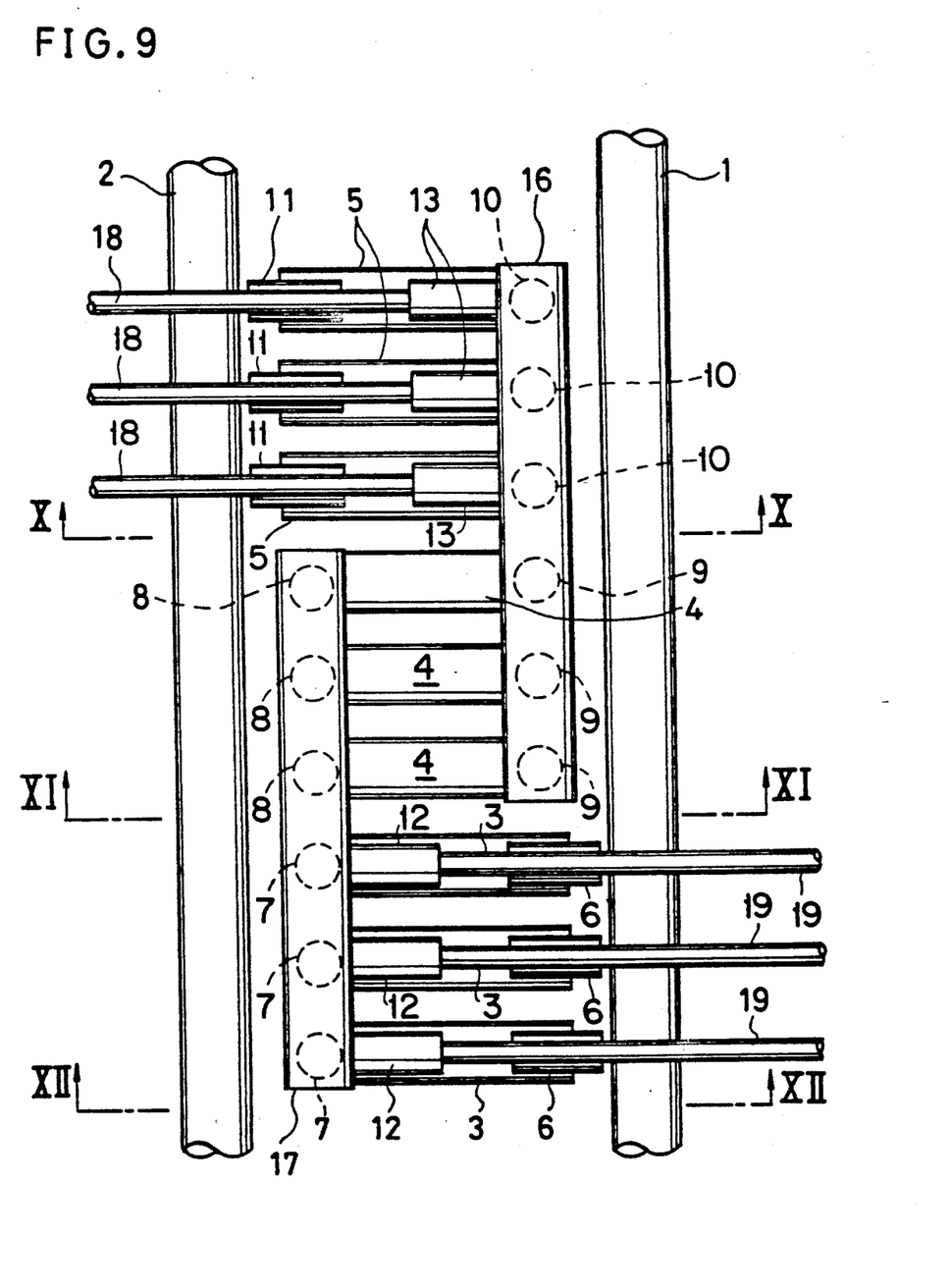
FIG. 9 is a plan view showing a gas insulated switchgear of another embodiment of the present invention.
Figure 10:
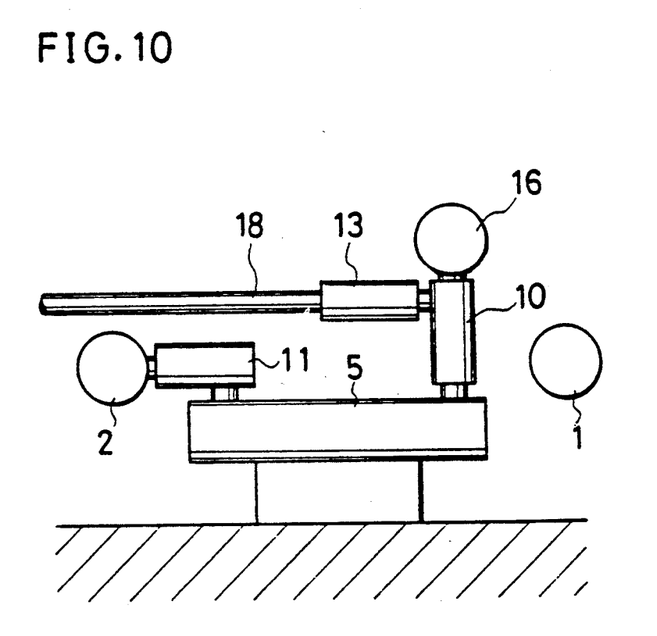
FIG. 10 is a cross-sectional view taken on the line X—X of FIG. 9.
Figure 11:
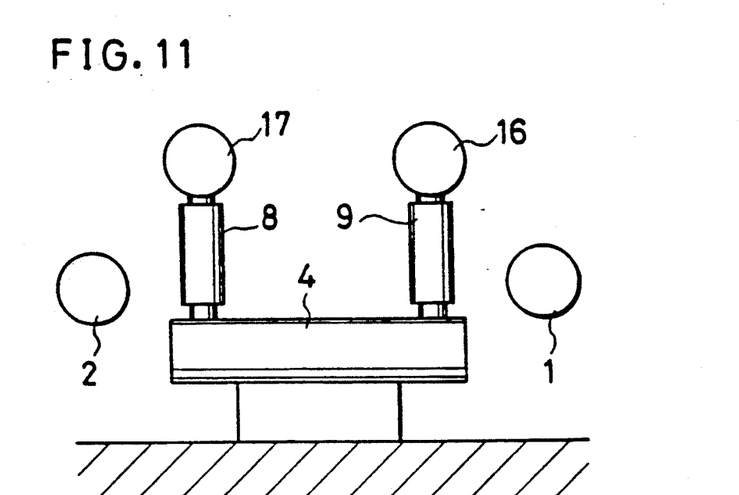
FIG. 11 is a cross-sectional view taken on the line XI—XI of FIG. 9.
Figure 12:
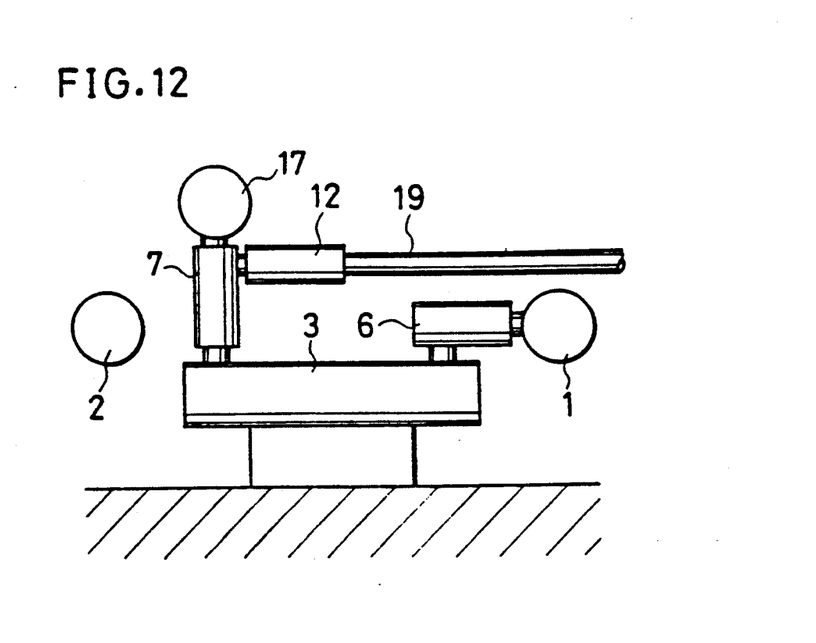
FIG. 12 is a cross-sectional view taken on the line XII—XII of FIG. 9.

FIG. 9 is a plan view of another gas insulated (8/1) switchgear embodying the skeleton diagram of FIG. 15. This embodiment differs from that shown in FIG. 5 only in the direction of extension of the branch buses 18 and 19 from this switchgear. In other words, the branch buses 18 and 19 are extended in the directions opposite to those of the Example 2, in order to embody the skeleton diagram of FIG. 15. As shown in the cross-sectional views of FIG. 10 through FIG. 12, the branch buses 18 and 19 and the disconnecting switches 12 and 13 extend from this switchgear through a space between the plane defined by the main buses 1 and 2, and the plane defined by the connection buses 16 and 17.

EXAMPLE 4

Figure 13:
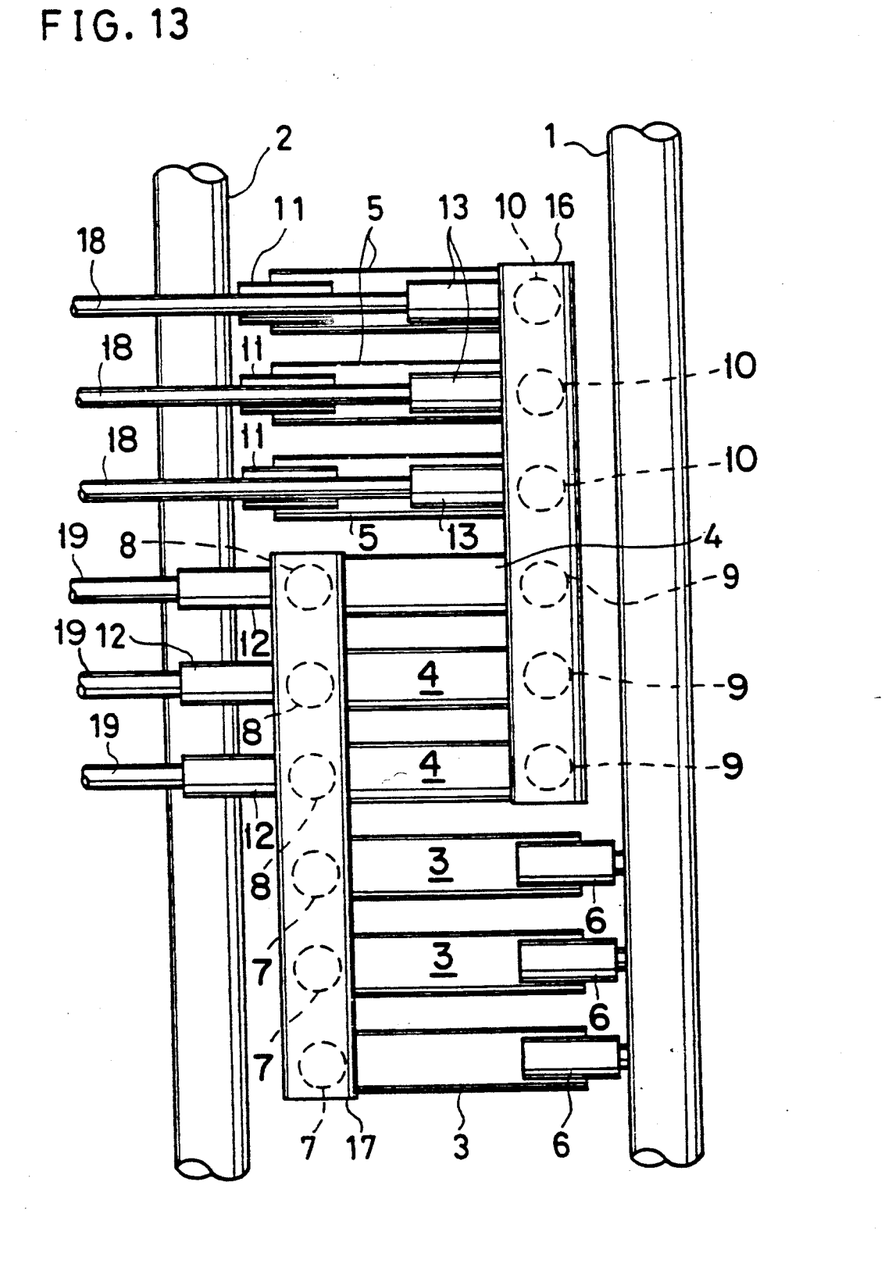
FIG. 13 is a plan view showing a gas insulated switchgear of a further embodiment of the present invention.

FIG. 13 is a plan view of a further gas insulated (8/7) switchgear embodying the skeleton diagram of FIG. 16. This embodiment also differs from that shown in FIG. 5 only in the direction of extension of the set of the branch buses 18 from the switchgear. In other words, only the set of the branch buses 19 extends in the direction opposite to that shown in FIG. 9 in order to embody the skeleton diagram of FIG. 16. Alternatively, the skeleton diagram may be embodied by combining the arrangements of the devices shown in FIGS. 5 and 9 to design the structure shown in FIG. 13.

Although the present invention has been described in its preferred form with a certain degree of particularity, it is understood that the present disclosure of the preferred form has been changed in the details of construction and the combination and arrangement of parts and components may be resorted to without departing from the spirit and the scope of the invention as hereinafter claimed.

What is claimed is:

1. Gas insulated switchgear comprising:
    a pair of main buses aligned substantially parallel to one another in a first direction to define a first plane and defining a space therebetween;
    a plurality of sets of circuit breakers, each set made up of a plurality of parallel circuit breakers, said sets being aligned substantially parallel to one another in a second direction substantially orthogonal to said first direction in a second plane under said first plane, said positioned to be beneath said space;
    a plurality of sets of first disconnecting switches, each of said disconnecting switches being mounted at a respective end of an associated one of said circuit breakers, for switchably connecting said plural sets of circuit breakers to one another in series, the series connection of said circuit breakers being connected across said main buses, at least one of said plurality of sets of first disconnecting switches being arranged to physically support one of said main buses and at least one other of said plurality of sets of first disconnecting switches being arranged to physically support the other of said main buses;
    a plurality of connection buses for connecting adjacent pairs of said plurality of sets of circuit breakers through adjacent pairs of said plurality of sets of first disconnecting switches, each of said connection buses being disposed substantially parallel to said main buses above said circuit breakers, and each of said connection buses being supported by the adjacent pairs of said plurality of sets of first disconnecting switches;
    a plurality of sets of second disconnecting switches, each of said sets of second disconnecting switches being supported by an adjacent one of said plurality of sets of first disconnecting switches and each of said second disconnecting switches being electrically connected to an electrical junction of adjacent pairs of said first disconnecting switches; and a plurality of sets of branch buses, each of said branch buses being respectively connected to an associated one of said second disconnecting switches, and each of said branch buses being connected to an outside-connection bushing.

2. Gas insulated switchgear in accordance with claim 1, wherein each of said circuit breakers is attached to a pair of said first disconnecting switches, one at each end of the circuit breaker, and an electrical junction between adjacent ones of said first disconnecting switches is electrically connected to each of said second disconnecting switches.

3. Gas insulated switchgear in accordance with claim 1 or 2, wherein said main buses are mounted on tops of corresponding sets of said first disconnecting switches.

4. Gas insulated switchgear in accordance with claim 1 or 2, wherein each of said connection buses is suspended over mid-parts of said circuit breakers with a substantial space between said connection buses and said circuit breakers, and supported by corresponding sets of said first disconnecting switches on sides of said first connecting switches.

5. Gas insulated switchgear in accordance with claim 1 or 2, wherein said connection buses, said second disconnecting switches and said branch buses are in a third plane which is disposed under said first plane.

6. Gas insulated switchgear in accordance with claim 1 or 2, wherein each of said connection buses is mounted on a top end of each of corresponding ones of said first disconnecting switches.

7. Gas insulated switchgear in accordance with claim 1 or 2, wherein corresponding sets of said first disconnecting switches, on top ends of which said connection buses are mounted, also support corresponding sets of said second disconnecting switches on sides of said corresponding sets of said first disconnecting switches, for connecting the corresponding sets of said first disconnecting switches to said branch buses.

8. Gas insulated switchgear in accordance with claim 1 or 2, wherein each of said main buses is outside a region defined by said parallel circuit breakers, and is supported at lateral ends of the corresponding sets of said first disconnecting switches, which are in parallel with and mounted on said circuit breakers, and which extend laterally from the ends of said circuit breakers.

9. Gas insulated switchgear in accordance with claim 8, wherein a third plane defined by said connection buses is disposed above a fourth plane defined by said second disconnecting switches and said branch buses, said fourth plane being disposed above said first plane.

10. Gas insulated switchgear in accordance with claim 9, wherein at least one set of said second disconnecting switches and corresponding sets of said branch buses are supported by corresponding sets of said first disconnecting switches over corresponding sets of said circuit breakers and extend from the switchgear over at least one of said main buses.

11. Gas insulated switchgear in accordance with claim 1 or 2, wherein a pair of connection buses, a pair of branch buses, a pair of outside-connection bushings, three sets of said circuit breakers, three sets of said first disconnecting switches, and two sets of said second disconnecting switches are contained in a structure.

12. Gas insulated switchgear in accordance with claim 1 wherein each of said disconnecting switches is mounted above a respective end of an associated one of said circuit breakers.

13. Gas insulated switchgear in accordance with claim 1 wherein said connection buses define a third plane which is not coplanar with said first plane.

* * * * *